May 26, 1936.　　B. H. McQUEER　　2,041,896

CARBONACEOUS BEARING MATERIAL

Filed May 16, 1934

INVENTOR
Bert H McQueer
BY
ATTORNEY

Patented May 26, 1936

2,041,896

UNITED STATES PATENT OFFICE 2,041,896

CARBONACEOUS BEARING MATERIAL

Bert H. McQueer, Saint Marys, Pa., assignor to Speer Carbon Company, a corporation of Pennsylvania Application May 16, 1934, Serial No. 726,010

4 Claims. (Cl. 308—242)

This invention relates to bearings and more especially to bearings consisting of, or containing, carbonaceous material, a portion of which is graphite, either natural or artificial.

Figure 1:
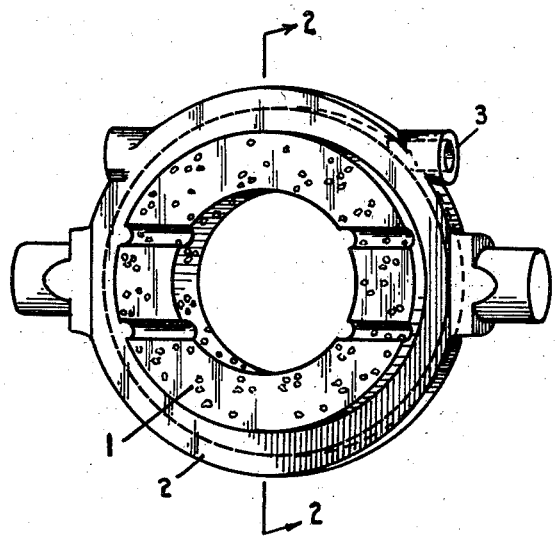
Fig. 1 is a perspective view of a clutch bearing cast-iron case.
Figure 2:
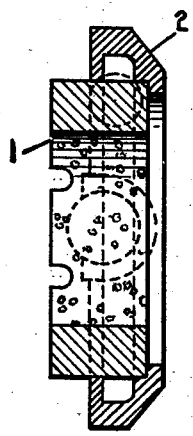
Fig. 2 is a section on line 2—2 of Fig. 1.

This invention is capable of use in various bearings, but by way of example, it may be said that there are certain bearings in automobiles which require special composition on account of the severe service and infrequent lubrication. In such uses the usual bronze or Babbit metal bearings have not been satisfactory due chiefly to failure of the operator to keep the bearing properly lubricated.

One form of material used in these bearings has been amorphous carbon, either with or without graphite to decrease the friction. Graphite has too low tensile and crushing strength to be used alone so it has been the practice to mill the amorphous carbon and graphite to fine particles and mix them together with a pitch or equivalent binder, after which the mixture was formed into the desired shape and baked to set the binder. To get better lubrication a considerable amount of graphite has been added in some cases. This of course lowered the friction as desired but at the same time it softened the face of the bearing and caused excessive wear.

The finished product of the prior art thus had graphite disseminated throughout in very fine particles surrounded by amorphous carbon. The latter was present in much greater amount to give the bearing strength and hardness. The resulting product was a practically homogeneous material of low permeability. Therefore the lubricant such as oil, which in a later step was soaked into the carbon bearings, could not freely pass out of the carbon body to the bearing surface when in use. The prior art bearing composition was particularly likely to give high friction at the start before the material had warmed up and caused the oil to soak out sufficiently to form a film over the bearing surface. Due to this, bearings frequently got quite hot and often burned out, particularly when new. If one attempted to increase the permeability of the matrix the resulting product was too weak and the rate of wear too high.

I have carried out many experiments to overcome these and other difficulties in carbon bearings and have found that the permeability of the carbon bearing may be controlled independently of the hardness and density of the general bearing structure by the introduction of particles of permeable materials in the amorphous carbon structure or matrix. I have also found that the total percentage of graphite in the bearing face may be increased above that of the prior art without undue softening or weakening of the structure if a portion of the graphite be added as permeable particles which have been previously treated or are handled in such a manner as to prevent their becoming broken down or disintegrated during their incorporation in the bearing structure.

In accordance with my new process I agglomerate graphite into a more or less loose, permeable, structure and after solidifying this structure, break the material into the desired sized particles which should be the "spot" size hereinafter referred to. I then incorporate these particles into the carbon matrix, taking care that the particles do not become encased in an impermeable shell of binder carbon. I am thus able to control both the permeability of the bearing and the amount of graphite in the bearing face independent of the hardness and density of the general bearing structure of matrix.

As will appear later herein my bearing blocks when finished have well defined graphite spots clearly contrasting with the carbonaceous matrix containing them, whereas prior art bearing blocks have the graphite in such fine form and so encased by baked-on binder that the individual graphite particles cannot be readily detected by the eye. These graphite spots that I employ need not be of any one definite size but they should be of sufficient volume to furnish relatively sizeable graphite spots surrounded by the amorphous carbon. The size of the graphite spots that I have successfully used and the method employed are as follows:

The main body or matrix may consist of any suitable amorphous carbon either with or without graphite. I have secured excellent results by making the matrix of milled calcined coke and fine graphite flour and hard pitch or other binder thoroughly mixed in heated condition. This of course liquefies the pitch. After cooling, the resulting mass is milled, say through 60 mesh. This 60 mesh material may for convenience be designated as the "A mix" and constitutes the matrix material.

The graphite spots may be made by milling natural graphite, say 90%, through 200 mesh and mixing it with such an amount of hard pitch in heated condition as will bind the graphite particles together without encasing them sufficiently with pitch to seriously reduce the permeability.

After cooling, the mass is milled through 20 to 40 mesh. That is, the resulting particles are no larger than 20 mesh and no smaller than 40 mesh and this spot material is essentially graphite. This material may be called the "B mix" for convenience. While I have successfully used the "B mix" as just described, with the desired proportion of the "A mix", I prefer to further treat the "B mix" by forming it into blocks, bake to about 1500° F. and then mill through 20 to 40 mesh. This treatment makes the particles more permeable and otherwise improves the lubricating quality of the "spots". In fact, by baking to this or higher temperature the spots are rendered more porous than the carbon matrix.

I have mixed the "A" and "B" mixes in various proportions and have produced successful bearings therefrom. From 2% to 15% of the "B mix" and 98% to 85% of the "A mix" give excellent results. The most suitable proportion appears to be 5% of the "B mix" and 95% of the "A mix".

These two mixes of the selected proportion are mixed cold and molded, extruded or otherwise formed into the desired shape of bearing and baked to preferably 2200° F. in about seven days, though a lower baking temperature gives good results also, after which they may be shaped or machined to size when desired.

I have also obtained excellent results by graphitizing the material constituting the "B mix" before it is milled to final "spot" condition. Also artificial graphite of the desired "spot" size may be used for the final "B mix".

In the drawing the bearing block 1 is made as described above and is forced into the cast-iron case 2 while the latter is in heated condition. This iron case is not part of the invention and any other means for holding the carbon block in position may be used. On cooling, the carbonaceous block is firmly held in place in the case. The assembly may then be soaked in oil, hot petrolatum or other lubricant material to aid the graphite in keeping the bearing lubricated. The relatively large spots of graphite aid in this absorption of lubricant and exude it during use. The spots therefore doubly affect the lubricating qualities of the bearing. They increase the permeability and increase the surface of the graphite in contact with the journal shaft. In use oil may be applied through the opening 3 which may have the usual cup or other oil receptacle.

Bearings made in accordance with my process have had remarkable success in severe tests where the prior art bearings have failed.

I have disclosed a particular form of bearing for a particular use but it will be apparent that the bearing material may be employed in many different forms and in many different uses. The invention is therefore not limited to any particular shape or use.

The invention is also not to be limited to the "spot" size given in the specific example. Other sizes may be used. The invention is not limited to graphite as a lubricating material since talc or other solid lubricants may be substituted. The novel feature is in using lubricating particles that are materially larger than the particles of the matrix and which are more permeable than the baked matrix material. In the prior art bearing material the carbon material of the matrix has been a very fine flour and the graphite mixed therewith has also been of fine size. Specifically, the prior practice has been to mill the amorphous carbon and graphite as a single mix to 90% through 200 mesh.

Having described my invention, what I claim is:

1. A bearing material adapted to hold lubricating fluid, consisting of fine particles of graphite and amorphous carbon, porous spots of graphite materially larger than said particles, said spots consisting of graphite powder held together by a porous graphitized binder, and a porous amorphous carbon binder holding said particles and said spots together whereby the said spots can absorb lubricating fluid when the bearing material is in contact therewith.

2. A bearing material adapted to hold lubricating fluid, consisting of fine particles of graphite and amorphous carbon, a substantial amount of the graphite particles being located together in spots free of said amorphous carbon particles and being held together by a porous binder, and a porous amorphous carbon binder holding said particles and spots together whereby said graphite spots can absorb lubricating fluid when the bearing material is in contact therewith.

3. A bearing material adapted to hold lubricating fluid, consisting of fine particles of amorphous carbon, spots of porous graphite materially larger than said particles, said spots consisting of graphite powder held together by a porous binder, and a porous amorphous carbon binder holding said particles and said spots together whereby the said spots can readily absorb lubricating fluid when the bearing material is in contact therewith.

4. A bearing material capable of absorbing lubricating fluid consisting of a porous matrix and porous spots of graphite interspersed therein and constituting not more than 15% of the matrix, said matrix consisting of amorphous carbon particles and a carbonaceous binder, the graphite spots being materially larger than said particles and having a porosity substantially equal to that of the matrix.

BERT H. McQUEER.